United States Patent
Hutchings et al.

(10) Patent No.: US 10,948,013 B2
(45) Date of Patent: Mar. 16, 2021

(54) BALL CARRIAGES

(71) Applicant: Hewlett-Packard Development Company, L.P., Spring, TX (US)

(72) Inventors: Cameron Hutchings, Boise, ID (US); David W. Otto, Boise, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/616,023

(22) PCT Filed: Jul. 10, 2017

(86) PCT No.: PCT/US2017/041358
§ 371 (c)(1),
(2) Date: Nov. 22, 2019

(87) PCT Pub. No.: WO2019/013748
PCT Pub. Date: Jan. 17, 2019

(65) Prior Publication Data
US 2020/0124092 A1   Apr. 23, 2020

(51) Int. Cl.
*F16C 29/06* (2006.01)
*F16C 29/00* (2006.01)

(52) U.S. Cl.
CPC ........ *F16C 29/0609* (2013.01); *F16C 29/008* (2013.01); *F16C 29/06* (2013.01)

(58) Field of Classification Search
CPC ........ F16C 29/008; F16C 29/04; F16C 29/06; F16C 29/0602; F16C 29/0609;
(Continued)

(56) References Cited

U.S. PATENT DOCUMENTS 4,489,990 A    12/1984   Teramachi
4,701,057 A *  10/1987   Kashiwabara ........ F16C 29/063
                                                          384/43
(Continued)

FOREIGN PATENT DOCUMENTS

WO    WO-2000025034 A1    5/2000
WO    WO2000025034 A1     5/2000
(Continued)

OTHER PUBLICATIONS

Six-row Recirculating Ball-bearing Linear Guide / Plastic, Schaeffler Technologies AG & Co. KG, pp. 1-40, Jun. 12, 2017.

*Primary Examiner* — James Pilkington
(74) *Attorney, Agent, or Firm* — Perry + Currier Inc

(57) ABSTRACT

A ball carriage includes a raceway including an engagement segment to urge balls into rolling engagement with an element that is movable relative to the ball carriage. The engagement segment defines an opening through which balls are to engage the element. The raceway includes a return segment including a curved surface to take balls out of engagement with the element. The engagement segment and the return segment share a raceway surface that runs a full length of the raceway to contain balls within the raceway. A ramp is positioned at a transition from the engagement segment to the return segment. The ramp rises from the raceway surface at the opening towards the return segment to guide balls out of engagement with the element and into the return segment.

15 Claims, 10 Drawing Sheets

(58) Field of Classification Search
CPC ............ F16C 29/0669; F16C 29/06671; F16C 29/0673; F16C 29/069
See application file for complete search history.

(56) References Cited

U.S. PATENT DOCUMENTS

| | | | | |
|---|---|---|---|---|
| 4,709,972 | A | * 12/1987 | LaBudde | A47B 21/007 312/208.3 |
| 4,749,284 | A | * 6/1988 | Teramachi | F16C 29/0642 384/45 |
| 5,558,442 | A | 9/1996 | Miller | |
| 5,809,834 | A | 9/1998 | Goldy | |
| 5,829,130 | A | 11/1998 | Miller | |
| 5,851,073 | A | * 12/1998 | Takeuchi | F16C 29/0602 384/45 |
| 6,092,774 | A | 7/2000 | Choy | |
| 6,158,373 | A | 12/2000 | Lange et al. | |
| 7,600,918 | B2 | * 10/2009 | Shirai | F16C 29/0633 384/45 |
| 7,946,551 | B1 | 5/2011 | Cvek | |
| 2008/0112656 | A1 | 5/2008 | Shirai et al. | |

FOREIGN PATENT DOCUMENTS

| | | |
|---|---|---|
| WO | WO-2002055895 A1 | 7/2002 |
| WO | WO2002055895 A1 | 7/2002 |

* cited by examiner

BALL CARRIAGES

BACKGROUND

Bearings, such as recirculating bearings, are used to provide movement between two components. Bearings often include balls that roll between two bearing surfaces to provide movement of the surfaces with respect to one another. In recirculating bearings, balls travel along a raceway into and out of engagement with a rail or other element that is moveable with respect to the raceway.

DETAILED DESCRIPTION

The shape of a bearing raceway, particularly at a transition with a rail or other movable element, may cause chatter or other undesirable characteristic in a bearing.

Figure 1:
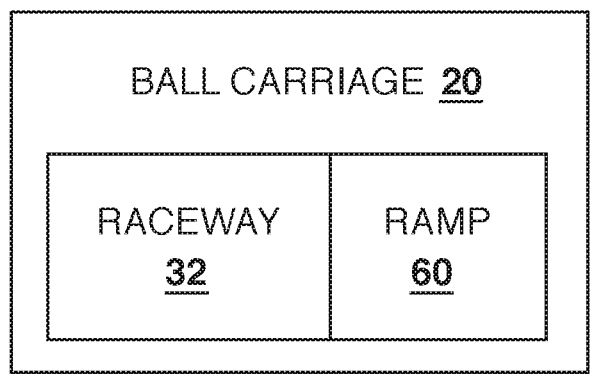
FIG. 1 is a block diagram of an example ball carriage.

FIG. 1 shows an example ball carriage 20 that includes a ball raceway 32 and a ramp 60. As will be discussed below, the ramp 60 may be positioned at a transition from an engagement segment of the raceway 32, where balls engage with a rail or other element, to a return segment, which may be curved to recirculate balls back to the rail. The ramp 60 may rise from a raceway surface common to the engagement segment and the return segment to provide a tilted surface to guide balls out of engagement with the rail and guide balls into the return segment. The ramp 60 may smooth the transition into the curve of the return segment and may reduce chatter.

Figure 2:
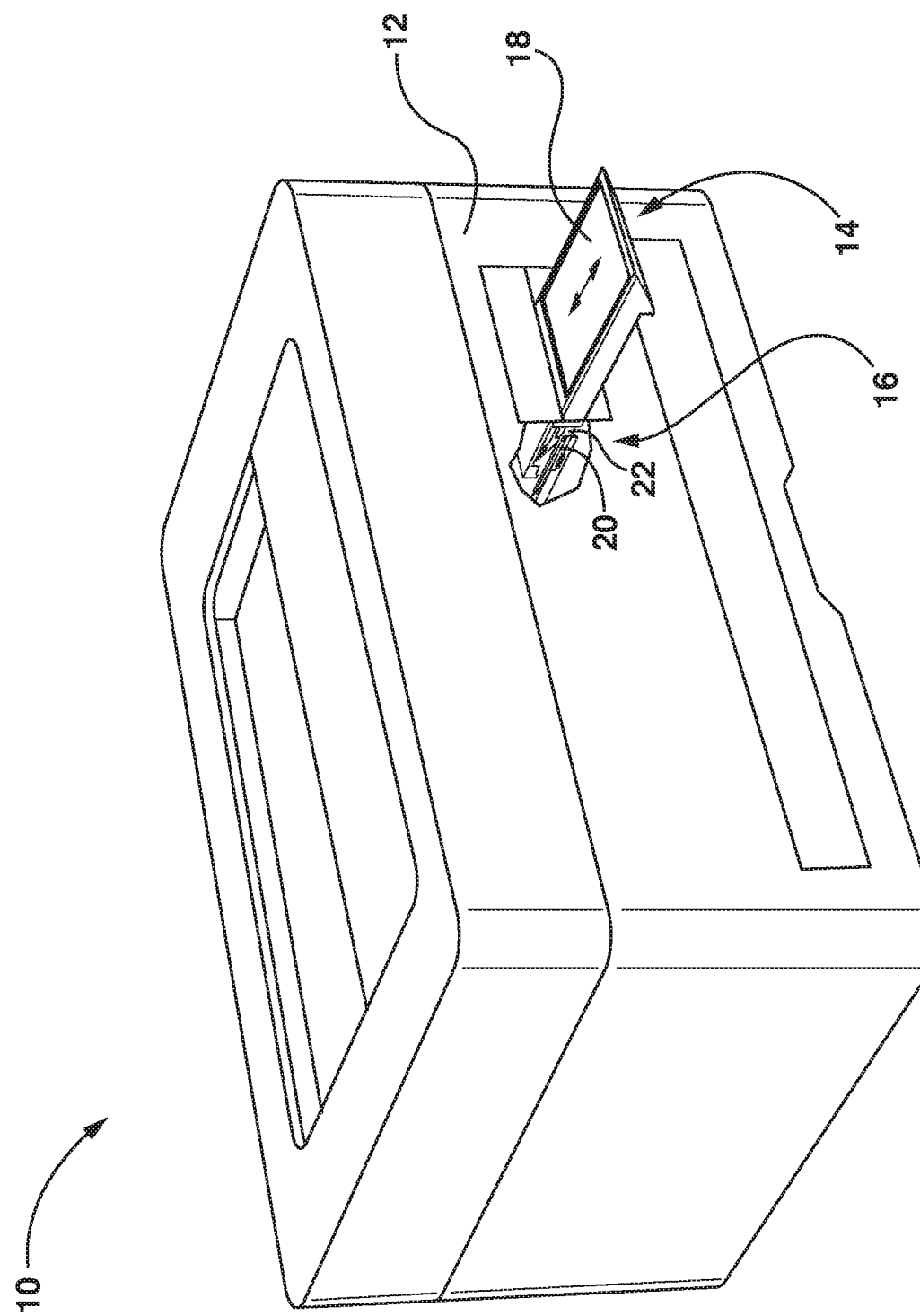
FIG. 2 is a perspective diagram of an example electronic device.

FIG. 2 shows an example electronic device 10, such as a printer, scanner, multifunction device, computer, or similar. The device 10 includes a frame 12, which may be referred to as a body, housing, or chassis. The electronic device 10 further includes a user interface assembly 14, which may include a user interface device 18, such as a keyboard, touchscreen, display device, or the like, which may allow a user to interact with the device 10.

The user interface assembly 14 is mounted to the frame 12 of the device 10 with a recirculating bearing assembly 16, which is shown at a cutaway portion of the frame 12. The recirculating bearing assembly 16 includes a ball carriage 20 and a rail 22 or other element that may be slidably inserted into the ball carriage 20. The recirculating bearing assembly 16 allows the user interface device 18 to slide with respect to the frame 12. The recirculating bearing assembly 16 may allow the user interface device 18 to slide into and out of the frame 12, which may allow the user interface device 18 to be hidden when not in use. A biasing mechanism, such as a spring, may be provided to bias the user interface device 18 at a position inside or outside of the frame 12. A locking mechanism may be provided to lock the user interface device 18 at a position inside or outside of the frame 12.

Figure 3:
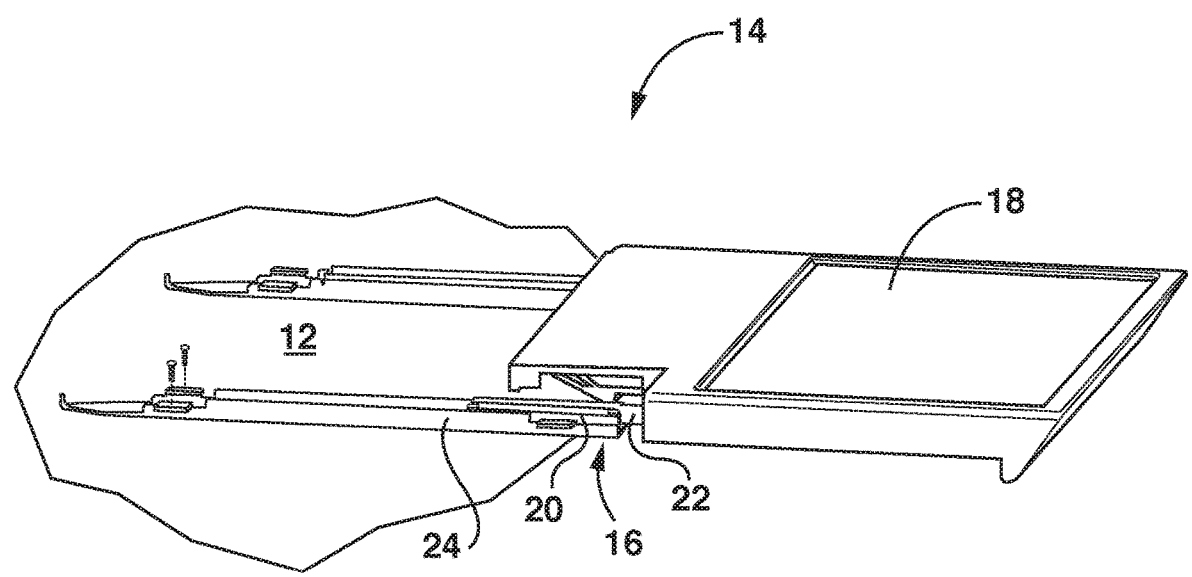
FIG. 3 is a perspective diagram of an example user interface assembly.

FIG. 3 shows a close-up view of an example user interface assembly 14, with the frame 12 of the electronic device schematically illustrated and cut away. The user interface assembly 14 includes a user interface device 18 attached to the frame 12 by a recirculating bearing assembly 16.

The recirculating bearing assembly 16 includes a ball carriage 20 and a rail 22. The rail 22 may be slidably inserted into the ball carriage 20. The user interface device 18 may be attached to the rail 22. The recirculating bearing assembly 16 may include a bracket 24 that holds the ball carriage 20 and that may be attached to the frame 12 to secure the ball carriage 20 to the frame 12. The ball carriage 20 may be directly attached to the frame 12.

The positions of the ball carriage 20 and the rail 22 may be reversed, in that the user interface device 18 may be attached to the ball carriage 20 and the rail 22 may be attached to the frame 12.

In the example shown, two recirculating bearing assemblies 16 are used to slidably connect the user interface device 18 to the frame 12. Other examples may use any number of recirculating bearing assemblies 16, such as one, two, three, or more.

Figure 4:
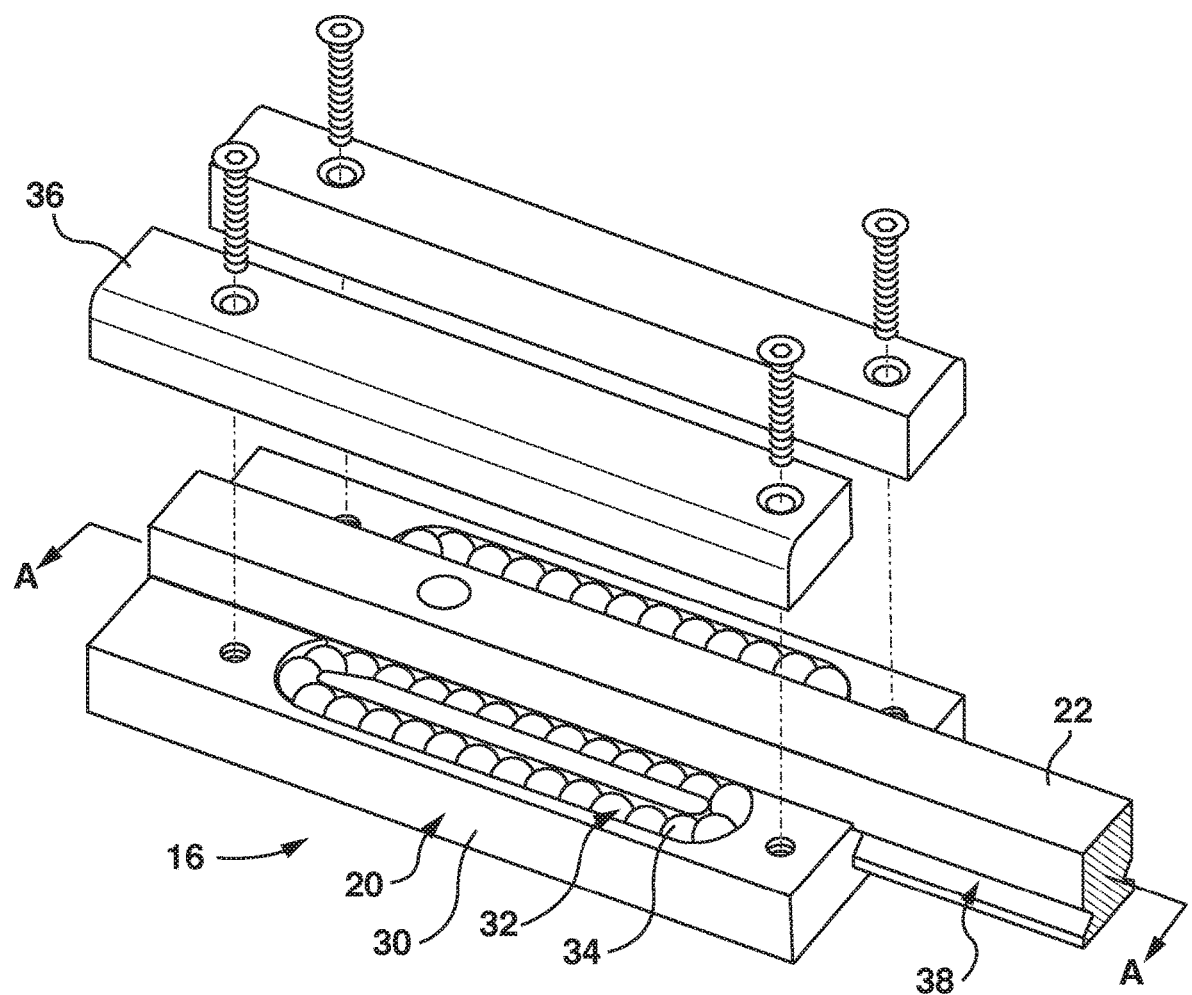
FIG. 4 is an exploded perspective diagram of an example recirculating bearing assembly.

FIG. 4 shows an example ball carriage 20 and an example rail 22.

The ball carriage 20 may include a body 30 shaped to define a recirculating raceway 32 to receive balls 34. The raceway 32 may be defined in the body 30 as a channel, groove, or similar feature. The balls 34 may roll or otherwise travel along the raceway 32 into and out of engagement with the rail 22. The direction of travel of the balls 34 may depend on the direction of movement of the rail 22.

A cover 36 may be provided to enclose the raceway 32 to prevent balls from escaping the raceway 32. The cover 36 may have a surface feature, such as a channel, groove, or similar, to cooperate with a complementary feature in the body 30 to define the raceway 32. The example cover 36 shown has a flat surface that covers the raceway channel in the body 30.

The body 30 and cover 36 may be made of molded plastic and may be joined by fasteners, such as screws.

The rail 22 may be an elongate member that extends through the ball carriage 20. The rail 22 may include a channel 38, groove, or similar feature to engage with the balls 34 carried by the ball carriage 20.

Two raceways 32 containing balls 34 may be provided on different sides of the rail 22. In the example shown, two raceways 32 are provided on opposite sides of the rail 22.

Figure 5:
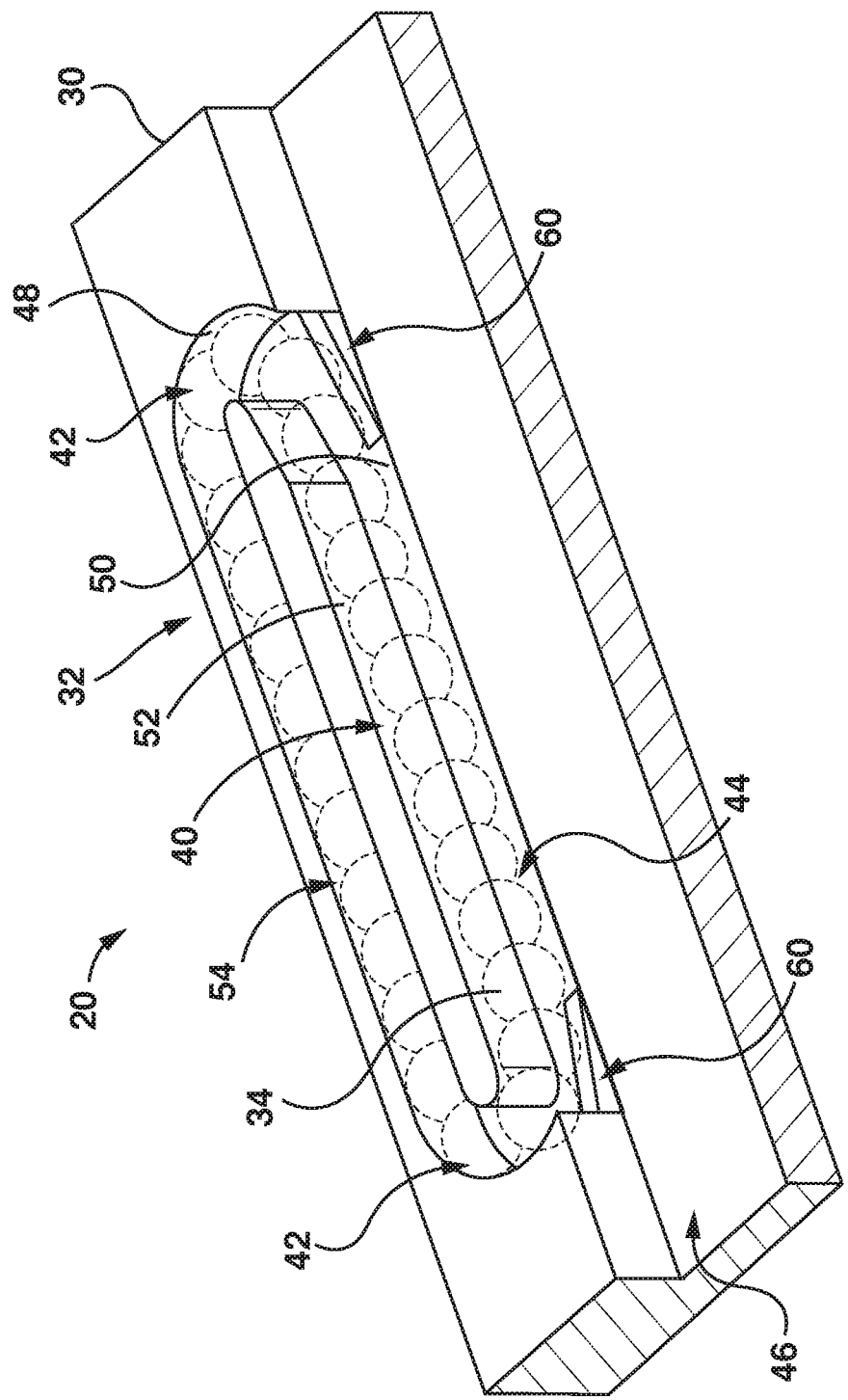
FIG. 5 is a sectioned perspective diagram of an example ball carriage, sectioned along A-A in FIG. 4.

FIG. 5 shows a portion of an example ball carriage 20. An example raceway 32 of the ball carriage 20 includes an engagement segment 40 and a return segment 42.

The engagement segment 40 defines an opening 44 that faces a channel 46 that is to receive a rail 22 (FIG. 4) or other element that is movable relative to the ball carriage 20. The opening 44 is shaped to allow balls 34 to engage the rail 22. The engagement segment 40 is positioned and shaped to urge balls into rolling engagement with the rail 22. For example, in the case of a linear rail 22, the engagement segment 40 may include a linear channel that has a width sized to force balls 34 to extend into the channel 46 that receives the rail 22.

The return segment 42 begins at the end of the engagement segment 40 and is shaped to take balls out of engagement with the rail 22. The return segment 42 includes a curved surface 48 to urge balls away from the opening 44.

The engagement segment 40 and the return segment 42 share a raceway surface 50, which may be flat, curved, dished, V-shaped, or have another profile. The raceway surface 50 may run a full length of the raceway 32 to contain the balls 34 within the raceway 32. In the orientation illustrated, the raceway surface 50 forms the bottom of the raceway 32, with the cover 36 (FIG. 4) forming the top of the raceway 32 and with an adjoining interior surface 52 positioned to urge balls 34 into the opening 44. Directional terms, such as "top" and "bottom" are used merely for convenience and are not intended to be limiting. The ball carriage 20 may be installed in any orientation.

The ball carriage 20 may allow the rail 22 to slide in both directions. Two return segments 42 may be provided at opposite ends of the engagement segment 40. The two return segments 42 may be linked by a transit segment 54 that completes the close-circuit raceway 32. Depending on the direction of movement of the rail 22 at any given time, one return segment 42 feeds balls into the engagement segment 40 and the other return segment 42 receives balls from the engagement segment 40.

A ramp 60 is positioned at a transition from the engagement segment 40 to the return segment 42. The ramp 60 may run from the raceway surface 50, at a location that is exposed to the opening 44, towards the curved return segment 42 and may rise over the run towards the return segment 42. The ramp 60 may be tilted away from the opening 44 to guide balls out of engagement with the rail 22 and into the curved return segment 42. The ramp 60 may be formed as integral to the body 30 of the ball carriage 20. For example, the body 30 may be injection molded with the ramp 60 being a feature of the mold.

Two ramps 60 may be provided, one at each return segment 42. Each ramp 60 guides balls 34 into the curvature of the return segment 42 when the balls 34 move in the direction of entry into the return segment 42.

The terms "rise," "rising," and similar, as used herein, may denote a displacement in a direction generally perpendicular to the plane of travel of a ball. These terms are not limited to vertical, up, down, left, right, or other direction. The ball carriages and other apparatuses discussed herein may be used in any orientation.

Figure 6:
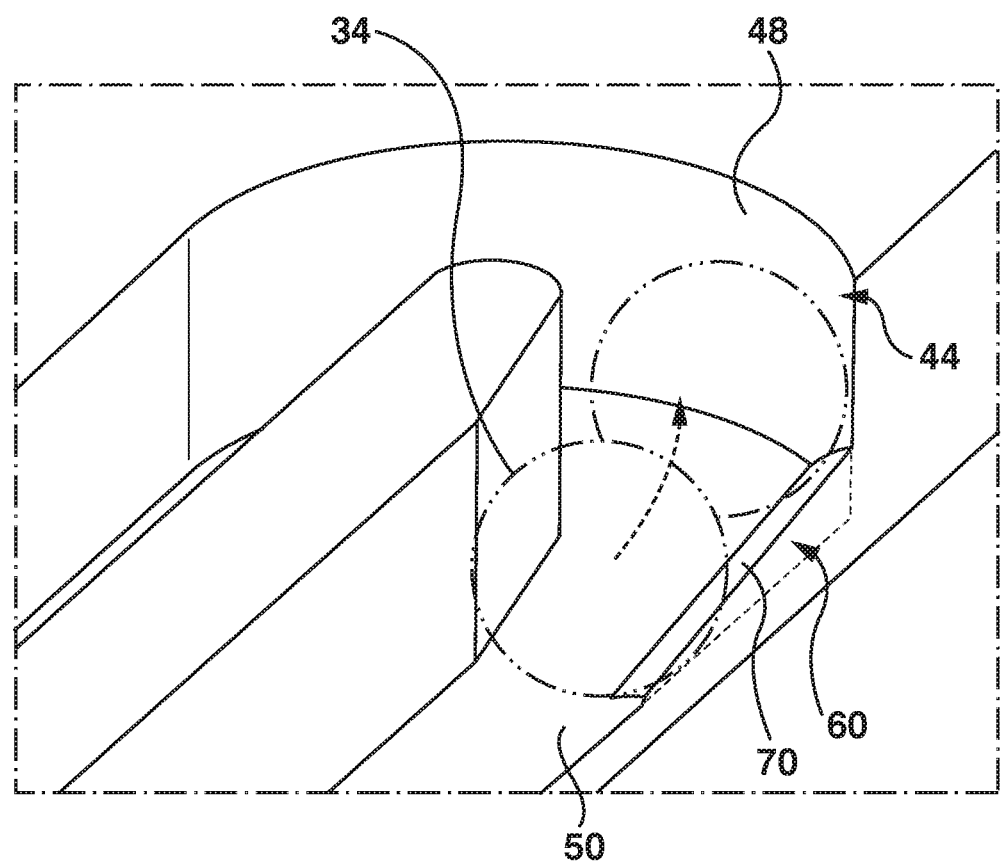
FIG. 6 is a close-up perspective diagram of an example ramp.

As shown in FIG. 6, the ramp 60 includes a ramp surface 70 that rises from a region of the raceway surface 50 exposed to the opening 44 towards the curved surface 48 of the return segment 42. The ramp surface 70 is tilted away from the opening 44 to guide the balls 34 into the turn formed by the curved surface 48.

Figure 7:
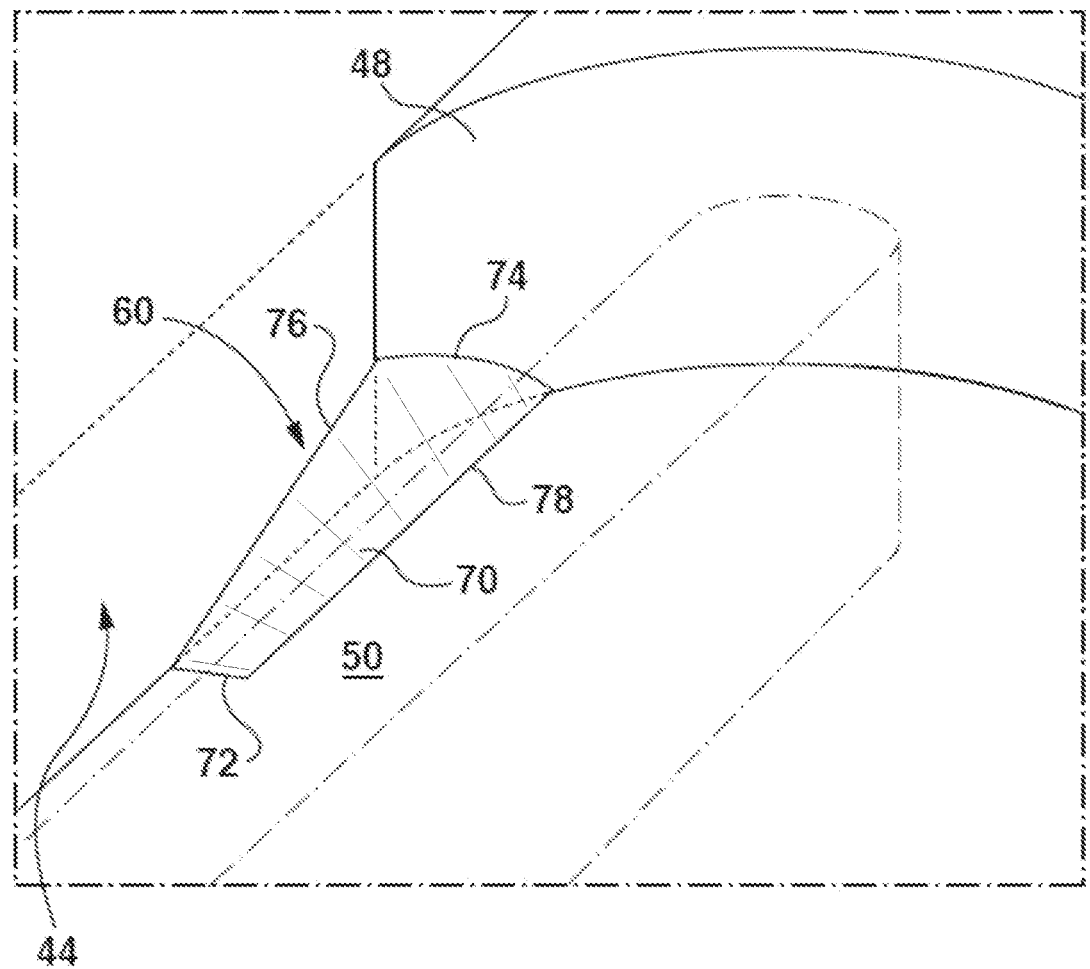
FIG. 7 is a close-up perspective diagram of another example ramp.

FIG. 7 shows an example ramp 60 as viewed from above the ball carriage. A ramp surface 70 may rise at an outside rising edge 76, which extends from a point at the raceway surface 50 exposed to the opening 44 to a point at the curved surface 48 distanced from the raceway surface 50. An inside edge 78 may bound the ramp surface 70 opposite the rising edge 76. The inside edge 78 may lie within the raceway surface 50 or may rise from the raceway surface 50 at a lower rate than the rising edge 76. An entry edge 72 and an opposing exit edge 74 may define the ends ramp surface 70. The entry edge 72 may lie within the raceway surface 50 or be slightly raised from the raceway surface 50, so as to receive balls incoming to the ramp surface 70. The exit edge 74 may lie within the curved surface 48. Each of the edges 72, 74, 76, 78 may be straight or curved.

The relative distance between points on the rising edge 76 and points on the inside edge 78 may provide an overall tilt to the ramp surface 70 away from the opening 44 to guide balls away from the opening 44 and into the curved return segment. The ramp surface 70 may be twisted, in that the entry edge 72 and the exit edge 74 may be at different angles with respect to the raceway surface 50 or with respect to the plane of travel of the balls. For example, the entry edge 72 may be parallel to the raceway surface 50 and the exit edge 74 may be angled with respect to the raceway surface 50. The twist (shown by contour lines in FIG. 7) may make the guiding of the balls away from the opening 44 gradual.

Figure 8:
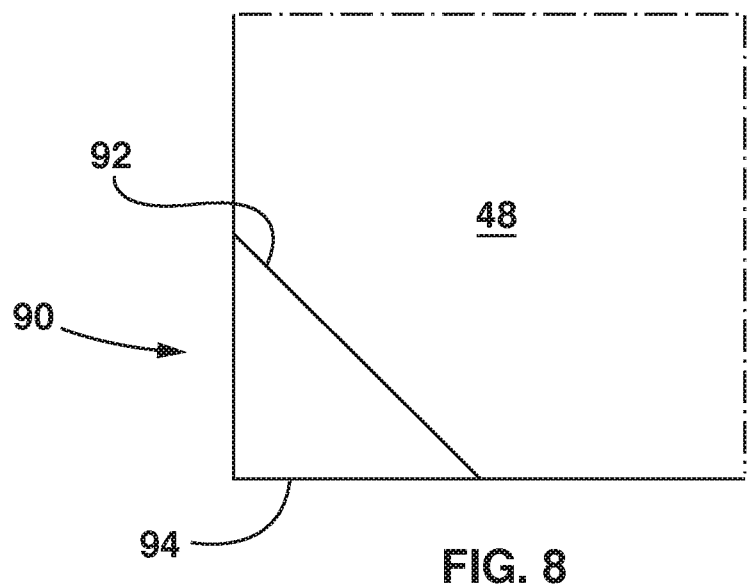
FIG. 8 is an end view of an example ramp.

FIG. 8 shows an example ramp 90 as viewed in the direction of ball travel as the ball approaches the ramp 90 and approaches a curved surface 48 of a curved return segment of a raceway. An exit edge 92 may be tilted with respect to an entry edge 94. This may give the surface of the ramp 90 a twisted shape to urge the ball into the curve defined by the curved surface 48.

Figure 9:
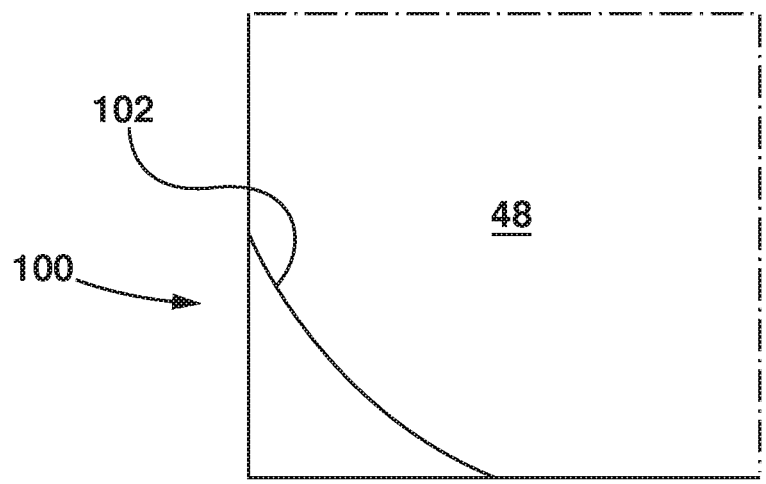
FIG. 9 is an end view of an example ramp with a dished surface.

FIG. 9 shows an example ramp 100 as viewed in the direction of ball travel as the ball approaches the ramp 100 and approaches a curved surface 48 of a curved return segment of a raceway. An exit edge 102 may be concavely contoured to match the shape of the balls.

Figure 10:
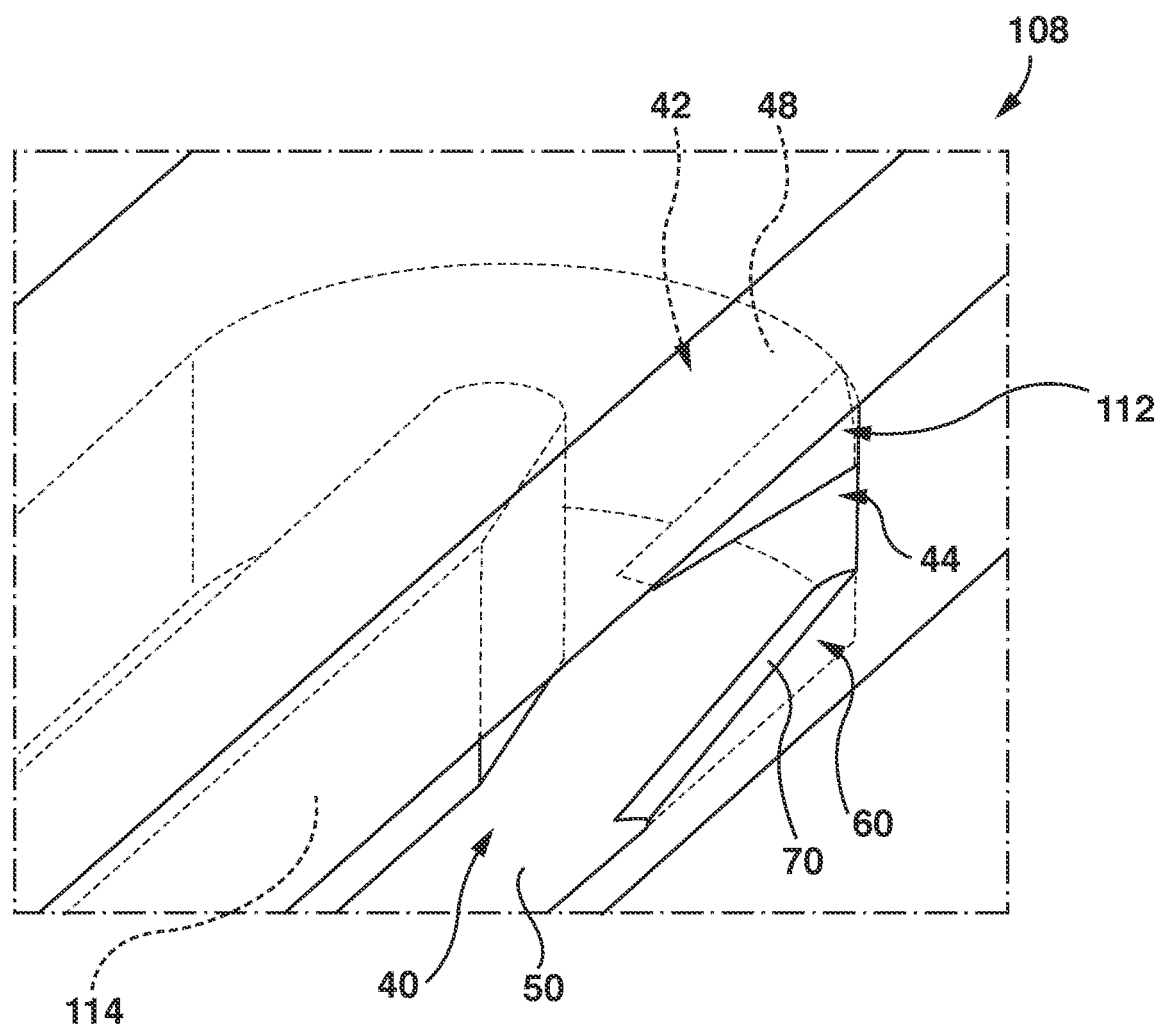
FIG. 10 is a close-up perspective diagram of an example ball carriage with several example ramps.

FIG. 10 shows a portion of another example ball carriage 108. The description for the other ball carriages discussed herein may be referenced, with like reference numerals denoting like components.

The ball carriage 108 includes a ramp 60 that rises from a first raceway surface 50 at a first transition from an engagement segment 40 to a curved return segment 42. The ball carriage 108 further includes a second ramp 112 positioned at a second transition from the engagement segment 40 to the return segment 42. The second ramp 112 rises from a second raceway surface 114 that is located opposite the first raceway surface 50. The first and second raceway surfaces 50, 114 cooperate to enclose a raceway. The ramps 60, 112 are located opposite from each other and are both tilted away from the opening 44 to guide balls out of engagement with a rail or element and into the return segment 42.

Figure 11:
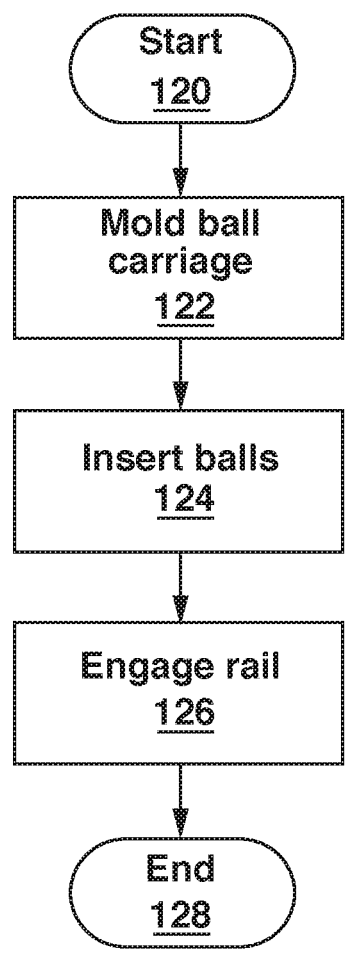
FIG. 11 is a flowchart of an example method.

FIG. 11 shows a flowchart of an example method of making an example bearing assembly. The method may be used to make any of the bearing assemblies discussed herein.

The method starts at block 120. A ball carriage is molded, at block 122. The ball carriage may be injection molded from plastic. The ball carriage may be injection molded as one unitary piece or as several pieces that are later fastened together. A separate cover for the ball carriage may be molded.

The ball carriage is molded to include a raceway that includes an engagement segment defining an opening through which balls are to engage a rail or other element that is to be inserted through the ball carriage. The raceway further includes a curved return segment to take balls out of engagement with the rail. The engagement segment and the curved return segment share a raceway surface that runs a full length of the raceway to contain balls within the raceway.

Molding the ball carriage may include molding the ramp as an integral feature of the ball carriage. That is, the mold may include features of the ball carriage and the ramp. The ramp may be positioned at a transition from the engagement segment to the curved return segment, and may run from the raceway surface to the curved return segment. The ramp may be shaped to tilt away from the opening to guide balls out of engagement with the rail and into the curved return segment.

At block 124, balls are inserted into the ball carriage. That is, the raceway may be filled with balls.

At block 126, a rail or other element is inserted into the ball carriage to engage with the balls. The method ends at block 128.

It should be recognized that features and aspects of the various examples provided above can be combined into further examples that also fall within the scope of the present disclosure.

The invention claimed is:

1. A ball carriage comprising:
   a raceway including an engagement segment to urge balls into rolling engagement with an element that is movable relative to the ball carriage, the engagement segment defining an opening through which balls are to engage the element, the raceway including a return segment including a curved surface to take balls out of engagement with the element, the engagement segment and the return segment sharing a raceway surface that runs a full length of the raceway to contain balls within the raceway; and
   a ramp monolithically formed with the raceway, the ramp positioned at a transition from the engagement segment to the return segment, the ramp rising from the raceway surface at the opening towards the return segment to guide balls out of engagement with the element and into the return segment.

2. The ball carriage of claim 1, wherein the ramp includes a ramp surface that rises from the raceway surface at the opening towards the return segment, the ramp surface to guide the balls.

3. The ball carriage of claim 2, wherein the ramp surface is tilted away from the opening to guide the balls away from the opening.

4. The ball carriage of claim 2, wherein the ramp surface is twisted.

5. The ball carriage of claim 2, wherein the ramp surface is concavely contoured.

6. The ball carriage of claim 1, wherein the raceway surface is a first raceway surface, the ramp is a first ramp, and the transition is a first transition, the ball carriage further comprising a second ramp positioned at a second transition from the engagement segment to the return segment, the second ramp rising from a second raceway surface opposite the first raceway surface at the opening towards the return segment to guide the balls out of engagement with the element and into the return segment.

7. The ball carriage of claim 1, wherein the element is an elongate rail and the engagement segment of the raceway is linear.

8. The ball carriage of claim 6, further comprising a removeable cover that includes the second ramp and the second raceway surface.

9. A user interface assembly comprising:
   a recirculating bearing assembly to attach to a frame; and
   a user interface device attached to recirculating bearing assembly to slide with respect to the frame;
   the recirculating bearing assembly including a rail and a ball carriage, the ball carriage including a raceway including an engagement segment to urge balls into rolling engagement with the rail, the engagement segment defining an opening through which balls are to engage the rail, the raceway including a curved return segment to take balls out of engagement with the rail, the engagement segment and the curved return segment sharing a raceway surface that runs a full length of the raceway to contain balls within the raceway; and
   the recirculating bearing assembly further including a ramp positioned at a transition from the engagement segment to the curved return segment, the ramp running from the raceway surface to the curved return segment, the ramp tilted away from the opening to guide the balls out of engagement with the rail and into the curved return segment, wherein the ramp is monolithic with the raceway.

10. The assembly of claim 9, wherein the ramp includes a twisted ramp surface that is tilted away from the opening.

11. The assembly of claim 9, wherein the ramp includes a concavely contoured ramp surface that is tilted away from the opening.

12. The assembly of claim 9, wherein the raceway surface is a first raceway surface, the ramp is a first ramp, and the transition is a first transition, the ball carriage further comprising a second ramp positioned at a second transition from the engagement segment to the curved return segment, the second ramp rising from a second raceway surface opposite the first raceway surface at the opening towards the curved return segment to guide the balls out of engagement with the rail and into the curved return segment.

13. The assembly of claim 12, further comprising a removeable cover that includes the second ramp and the second raceway surface.

14. A method comprising:
   molding a ball carriage, the ball carriage including a raceway including an engagement segment defining an opening through which balls are to engage a rail, the raceway including a curved return segment to take balls out of engagement with the rail, the engagement segment and the curved return segment sharing a raceway surface that runs a full length of the raceway to contain balls within the raceway, the ball carriage further including a ramp positioned at a transition from the engagement segment to the curved return segment, the ramp is monolithic with the raceway and runs from the raceway surface to the curved return segment, the ramp tilted away from the opening to guide the balls out of engagement with the rail and into the curved return segment;
   inserting balls into the ball carriage; and
   engaging the rail with the balls.

15. The method of claim 14, further comprising:
   connecting a cover to the ball carriage to enclose the raceway, wherein the raceway surface is a first raceway surface, the ramp is a first ramp, and the transition is a first transition, wherein the cover comprises a second ramp positioned at a second transition from the engagement segment to the curved return segment, the second ramp rising from a second raceway surface opposite the first raceway surface at the opening towards the curved return segment to guide the balls out of engagement with the rail and into the curved return segment.

\* \* \* \* \*